United States Patent
Liu et al.

(10) Patent No.: US 12,140,839 B2
(45) Date of Patent: Nov. 12, 2024

(54) LIQUID CRYSTAL ALIGNMENT METHOD, LIQUID CRYSTAL DISPLAY PANEL, AND MOBILE TERMINAL

(71) Applicant: Shenzhen China Star Optoelectronics Semiconductor Display Technology Co., Ltd., Guangdong (CN)

(72) Inventors: Jinming Liu, Guangdong (CN); Yoonsung Um, Guangdong (CN); Juncheng Xiao, Guangdong (CN); Ji Li, Guangdong (CN); Yun Yu, Guangdong (CN); Xiaojin He, Guangdong (CN); Qi Zhang, Guangdong (CN); Chunxiao Hu, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/603,652

(22) PCT Filed: Aug. 26, 2021

(86) PCT No.: PCT/CN2021/114685
§ 371 (c)(1),
(2) Date: Oct. 14, 2021

(87) PCT Pub. No.: WO2023/019624
PCT Pub. Date: Feb. 23, 2023

(65) Prior Publication Data
US 2024/0027846 A1    Jan. 25, 2024

(30) Foreign Application Priority Data

Aug. 19, 2021 (CN) .......................... 202110954639.3

(51) Int. Cl.
*G02F 1/1343* (2006.01)
*G02F 1/1337* (2006.01)

(52) U.S. Cl.
CPC .. *G02F 1/134309* (2013.01); *G02F 1/133707* (2013.01)

(58) Field of Classification Search
None
See application file for complete search history.

(56) References Cited

U.S. PATENT DOCUMENTS

| 2007/0040973 A1* | 2/2007 | Lee | G02F 1/133753 349/124 |
| 2010/0053526 A1* | 3/2010 | Kye | G02F 1/133753 349/124 |

(Continued)

FOREIGN PATENT DOCUMENTS

| CN | 101526702 | 9/2009 |
| CN | 101740581 | 6/2010 |

(Continued)

*Primary Examiner* — Ryan Crockett

(57) ABSTRACT

The present application discloses a liquid crystal alignment method, a liquid crystal display panel, and a mobile terminal. In a liquid crystal alignment process, an external electrode receives an alignment voltage, and a pretilt angle of a liquid crystal molecule corresponding to a branch electrode is smaller than a pretilt angle of a liquid crystal molecule corresponding to a slit. In an actual driving process, because an overall pretilt angle of liquid crystal molecules is increased and pretilt angles in a same domain of a subpixel are differentiated, a response time and view angle features of medium and low grayscale of the liquid crystal display panel can be improved.

20 Claims, 7 Drawing Sheets

(56) References Cited

U.S. PATENT DOCUMENTS

| | | | |
|---|---|---|---|
| 2015/0103299 A1 | 4/2015 | Son et al. | |
| 2015/0253635 A1* | 9/2015 | Ding | H01L 29/41733 |
| | | | 438/158 |
| 2016/0291413 A1* | 10/2016 | Peng | G02F 1/1341 |
| 2016/0377927 A1* | 12/2016 | Ye | G02F 1/1368 |
| | | | 349/43 |
| 2017/0235180 A1 | 8/2017 | Matsumura et al. | |
| 2018/0210249 A1* | 7/2018 | Ma | H01L 29/7869 |
| 2022/0308372 A1* | 9/2022 | Liu | G02F 1/133742 |

FOREIGN PATENT DOCUMENTS

| | | | |
|---|---|---|---|
| CN | 101872098 | | 10/2010 |
| CN | 101872098 A | * | 10/2010 |
| CN | 104714342 | | 6/2015 |
| CN | 106773335 | | 5/2017 |
| CN | 108398834 | | 8/2018 |
| CN | 110031990 | | 7/2019 |
| CN | 111208676 | | 5/2020 |
| CN | 111880340 | | 11/2020 |

\* cited by examiner

LIQUID CRYSTAL ALIGNMENT METHOD, LIQUID CRYSTAL DISPLAY PANEL, AND MOBILE TERMINAL

RELATED APPLICATIONS

This application is a National Phase of PCT Patent Application No. PCT/CN2021/114685 having International filing date of Aug. 26, 2021, which claims the benefit of priority of Chinese Patent Application No. 202110954639.3 filed on Aug. 19, 2021. The contents of the above applications are all incorporated by reference as if fully set forth herein in their entirety.

FIELD AND BACKGROUND OF THE INVENTION

The present invention relates to display technologies, and more particularly, to a liquid crystal alignment method, a liquid crystal display panel, and a mobile terminal.

A large-size thin film transistor liquid crystal display (TFT-LCD) is currently the mainstream technology used in TVs. With the continuous improvement of information technologies and living standards, people have increasingly high requirements for display quality such as a response time and a view angle. In addition, compared to an in-plane switching liquid crystal display (IPS-LCD) and an organic light-emitting diode display (OLED), a vertical alignment liquid crystal display (VA-LCD) has a poor view angle. Therefore, the improvement of the view angle has always been the focus of VA-LCD researchers. According to a transmissive liquid crystal alignment principle and a driving scheme, if the view angle is to be improved, a pixel needs to be divided into a plurality of domains, but this may cause a transmittance loss. Under a same pixel structure condition, a liquid crystal pretilt angle is one of the important factors affecting the response time and the view angle. Therefore, there is a need to work out a solution of differentiating liquid crystal pretilt angles needs to be developed, thereby significantly improving the display quality.

The principle of the existing HVA alignment technology and the liquid crystal penetration features are shown in FIG. 1(a) to FIG. 1(c), where FIG. 1(a) is a cross-sectional view of a liquid crystal display panel before alignment, FIG. 1(b) is a cross-sectional view of a liquid crystal display panel after alignment is completed, and FIG. 1(c) is a schematic diagram of an electric field strength between a branch electrode and a common electrode and an electric field strength between a slit and a common electrode in a pixel layer in an alignment process. FIG. 2 is a schematic structural diagram of a subpixel of a pixel layer. In an alignment process, a common electrode 140 receives an alignment voltage, and a direction of an electric field is directed from the common electrode 140 to a pixel layer 150. As can be seen in FIG. 1(c), because there is little difference between an electric field strength between a branch electrode 152 and the common electrode 140 and an electric field strength between a slit 153 and the common electrode 140 in a same domain of a subpixel 151 of the pixel layer 150, for example, when the electric field strength between the branch electrode 152 and the common electrode 140 is an electric field strength formed under a voltage of 17 V, in this case, the electric field strength between the slit 153 and the common electrode 140 may reach an electric field strength formed under a voltage of 16 V. In this way, in a liquid crystal layer 130, a pretilt angle formed by a liquid crystal molecule 131 corresponding to the branch electrode 152 and a pretilt angle formed by a liquid crystal molecule 131 corresponding to the slit 153 are basically the same. Referring to FIG. 1(b), a pretilt angle $\theta_a$ of a liquid crystal molecule 131 is about 1.4°. Consequently, in an actual driving process, because there is no difference between the pretilt angle of the liquid crystal molecule 131 corresponding to the branch electrode 152 and the pretilt angle of the liquid crystal molecule 131 corresponding to the slit 153 in a same domain region of the subpixel 151, a low grayscale view angle of the panel is relatively single.

SUMMARY OF THE INVENTION

Embodiments of the present application provide a liquid crystal alignment method, a liquid crystal display panel, a mobile terminal, and an alignment device, so as to resolve the problem of a poor low grayscale view angle of the existing liquid crystal display panel.

An embodiment of the present application provides a liquid crystal alignment method, including:
  providing a first substrate and a second substrate arranged opposite to each other;
  forming a pixel layer on one side of the first substrate facing the second substrate, where the pixel layer includes a plurality of subpixels arranged in an array, each of the subpixels includes at least two branch electrodes arranged in parallel, and a slit is formed between two of the branch electrodes;
  forming a common electrode on one side of the second substrate facing the first substrate;
  forming a liquid crystal layer including a plurality of liquid crystal molecules between the first substrate and the second substrate to form a liquid crystal display panel;
  placing the liquid crystal display panel on an external electrode, and applying an alignment voltage to the external electrode, so that a pretilt angle formed by a liquid crystal molecule arranged corresponding to the branch electrode is smaller than a pretilt angle formed by a liquid crystal molecule arranged corresponding to the slit; and
  performing irradiation with ultraviolet light to fix the liquid crystal molecules at the pretilt angles.

Further, an electric field strength between the branch electrode and the common electrode is lower than an electric field strength between the slit and the common electrode.

Further, a voltage value of the alignment voltage is in a range of 90-100 V.

An embodiment of the present application further provides a liquid crystal display panel, including: a first substrate and a second substrate arranged opposite to each other; a liquid crystal layer, including a plurality of liquid crystal molecules, arranged between the first substrate and the second substrate; a common electrode, arranged on one side of the second substrate facing the first substrate; and a pixel layer, arranged on one side of the first substrate facing the second substrate, where the pixel layer includes a plurality of subpixels arranged in an array, each of the subpixels includes at least two branch electrodes arranged in parallel, and a slit is formed between two of the branch electrodes, wherein a pretilt angle of a liquid crystal molecule arranged corresponding to the branch electrode is smaller than a pretilt angle of a liquid crystal molecule arranged corresponding to the slit.

Further, a gate insulating layer and a protective layer are arranged between the first substrate and the pixel layer in a stacking manner, and the pixel layer is arranged on the protective layer.

Further, a spacing between the common electrode and the pixel layer is in a range of 3.2-3.3 μm.

Further, absolute values of differences between azimuth angles of liquid crystal molecules at edge positions of opposite sides of the branch electrode and an azimuth angle of a liquid crystal molecule at a central position of the branch electrode are equal.

Further, the liquid crystal display panel includes a first alignment layer arranged on one side of the pixel layer facing the liquid crystal layer and a second alignment layer arranged on one side of the common electrode facing the liquid crystal layer.

An embodiment of the present application further provides a mobile terminal, where the mobile terminal includes a terminal body and the liquid crystal display panel described above.

The beneficial effects of the present application are as follows: An external electrode is arranged on one side of a first substrate away from a second substrate, and an alignment voltage is applied to the external electrode in a liquid crystal alignment process, so that in a same domain region of a subpixel, there is a difference between a pretilt angle of a liquid crystal molecule in a liquid crystal layer corresponding to a branch electrode and a pretilt angle of a liquid crystal molecule in a liquid crystal layer corresponding to a slit, and the difference is obvious. Therefore, in an actual driving process of a liquid crystal display panel, because an overall pretilt angle of liquid crystal molecules in a liquid crystal layer is increased and pretilt angles in a same domain are differentiated, a response time and view angle features of medium and low grayscale of the liquid crystal display panel can be improved.

BRIEF DESCRIPTION OF THE SEVERAL VIEWS OF THE DRAWINGS

The following describes specific implementations of this application in detail with reference to the accompanying drawings, to make the technical solutions and other beneficial effects of this application obvious.

The component numbers in the figures are as follows:
100. liquid crystal display panel, 110. first substrate, 120. second substrate, 130. liquid crystal layer, 131. liquid crystal molecule, 131a. liquid crystal molecule region arranged corresponding to branch electrode, 131b. liquid crystal molecule region arranged corresponding to slit, 140. common electrode, 150. pixel layer, 151. subpixel, 151a. main region, 151b. secondary region, 152. branch electrode, 153. slit, 160. gate insulating layer, 170. protective layer, 181. first array common electrode, 182. second array of common electrode; 200. alignment device, 201. external electrode; 300. scan line; and 400. data line.

DETAILED DESCRIPTION OF SPECIFIC EMBODIMENTS OF THE INVENTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of this application without creative efforts shall fall within the protection scope of this application.

In a liquid crystal display panel, a layer of external electrode is added on one side of a first substrate away from a second substrate, and an alignment voltage is applied to the external electrode in a liquid crystal alignment process, so that in a same domain region of a subpixel, there is a difference between a pretilt angle of a liquid crystal molecule arranged corresponding to a branch electrode and a pretilt angle of a liquid crystal molecule arranged corresponding to a slit. Therefore, a response time and view angle features of medium and low grayscale of the liquid crystal display panel can be improved. As a typical application, the liquid crystal display panel may be applied to a mobile terminal, such as a TFT-LCD mobile terminal with a VA-LCD panel, that is, the liquid crystal display panel is a VA-LCD panel, and the mobile terminal is a TFT-LCD display.

Figure 2:
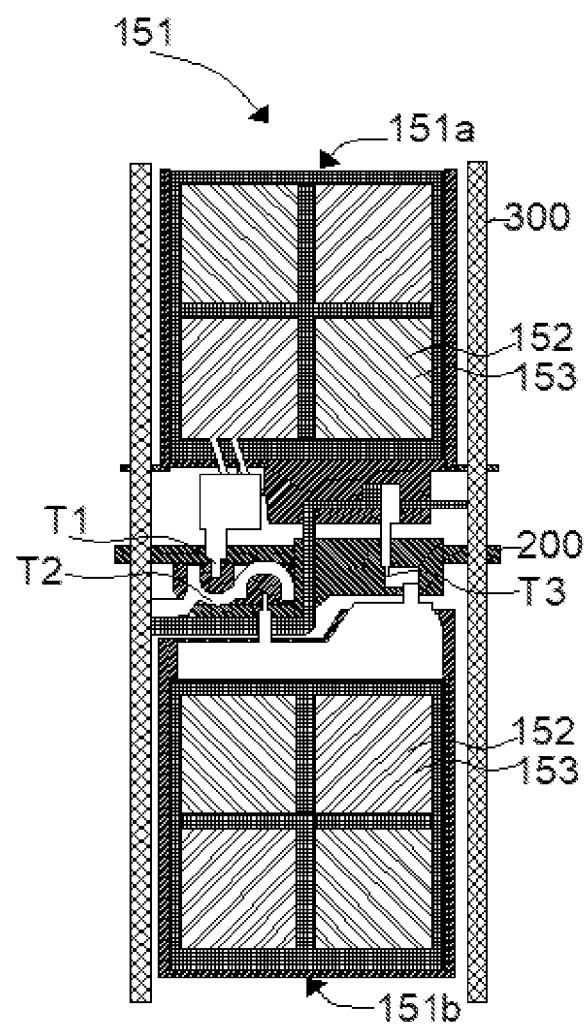
FIG. 2 is a schematic structural diagram of a subpixel of a pixel layer.
Figure 3:
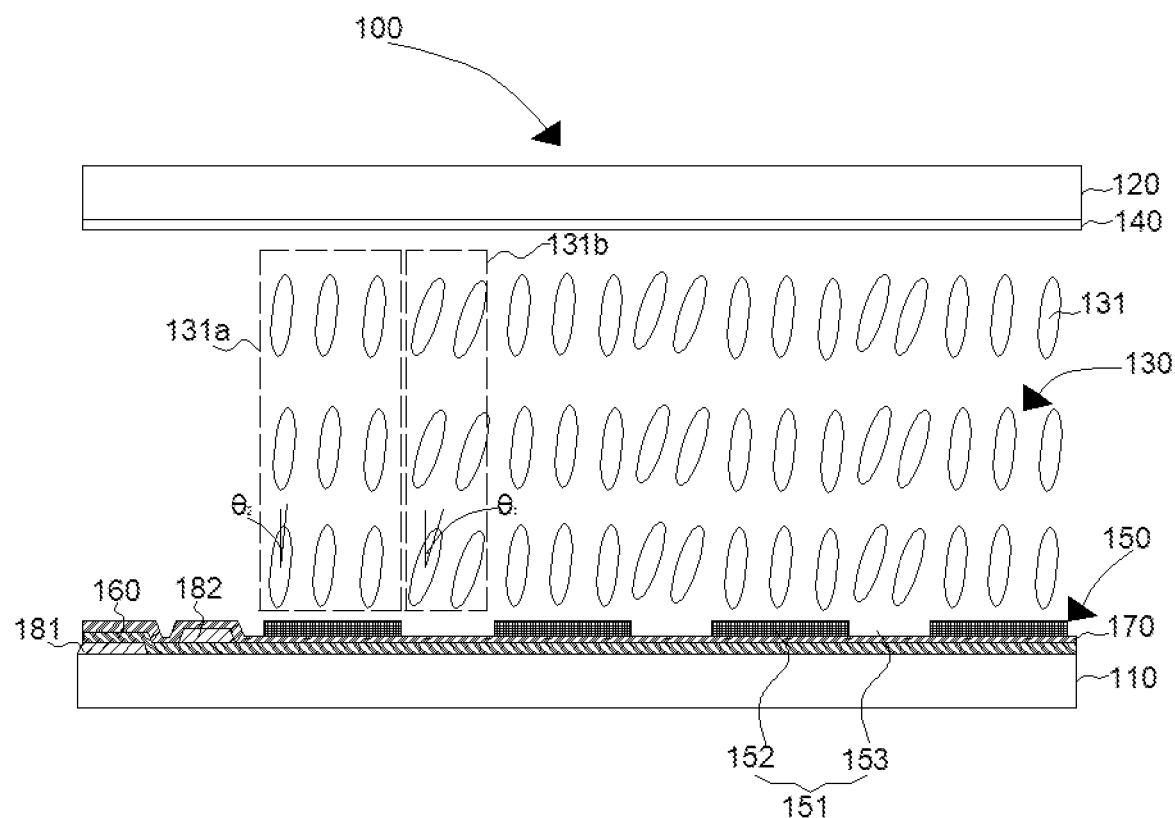
FIG. 3 is a cross-sectional view of a liquid crystal display panel after liquid crystal alignment is completed according to an exemplary embodiment of the present invention.

Referring to FIG. 3, in an embodiment of the present invention, a liquid crystal display panel 100 includes a first substrate 110, a second substrate 120, a liquid crystal layer 130, a common electrode 140, and a pixel layer 150. The first substrate 110 and the second substrate 120 are arranged opposite to each other, and the liquid crystal layer 130 includes a plurality of liquid crystal molecules 131. A gate insulating layer 160 (GI layer) and a protective layer 170 (PV layer) are arranged between the first substrate 110 and the pixel layer 150 in a stacking manner. The pixel layer 150 is arranged on one side of the protective layer 170 away from the gate insulating layer 160, a second array common electrode 182 (M2) is arranged between the protective layer 170 and the gate insulating layer 160, and a first array common electrode 181 (M1) is arranged between the gate insulating layer 160 and the first substrate 110. The pixel layer 150 includes a plurality of subpixels 151 arranged in an array. For a structure of the subpixels 151, refer to FIG. 2. The structure of the subpixels 151 in this embodiment takes a 3T_8 domain structure as an example, but is not limited to the 3T_8 domain structure. A 4-domain structure may also be used, and quantities of thin film transistors and capacitors in a pixel structure are not limited. For example, for 2T1C or 3T1C, each subpixel 151 includes a main region 151a and a secondary region 151b. In a pixel array, a scan line 300 is arranged between two adjacent rows of subpixels, and a data line 400 is arranged between two adjacent rows of subpixels. Each of the subpixels 151 further includes: a main region thin film transistor T1, a secondary region thin film transistor T2, and a shared thin film transistor T3. A gate of the main region thin film transistor T1 is connected to the scan line 300, a source of the main region thin film transistor T1 is connected to the data line 400, and a drain of the main region thin film transistor T1 is connected to a main region pixel electrode (not shown in the figure) in the main region 151a. A gate of the secondary region thin film transistor T2 is connected to the scan line 300, a source of the secondary region thin film transistor T2 is connected to the data line 400, and a drain of the secondary region thin film transistor T2 is connected to a secondary region pixel electrode (not shown in the figure) in the secondary region 151b. A gate of the shared thin film transistor T3 is connected to the scan line 300, a source of the shared thin film transistor T3 is connected to the main region pixel electrode, and a drain of the shared thin film transistor T3 is connected to the secondary region pixel electrode. The main region pixel electrode and the secondary region pixel electrode form a pixel electrode of the subpixels 151.

A main region storage electrode is divided into 4 domains, each domain includes a plurality of branch electrodes 152 arranged in parallel and spaced apart, and a slit 153 is formed between two adjacent branch electrodes 152. A secondary region storage electrode is divided into 4 domains, each domain includes a plurality of branch electrodes 152 arranged in parallel and spaced apart, and a slit 153 is formed between two adjacent branch electrodes 152. A region at which the branch electrode 152 is located is a line region, and a region at which the slit 153 is located is a space region. A pretilt angle formed by a liquid crystal molecule 131 arranged corresponding to the branch electrode 152 is smaller than a pretilt angle formed by a liquid crystal molecule 131 arranged corresponding to the slit 153. In this embodiment, the slit 153 includes a region between two adjacent branch electrodes 152 in one subpixel 151. As an improvement, the slit 153 may further include a region between two adjacent subpixels 151, specifically, a region between adjacent pixel electrodes of two adjacent subpixels 151. The first substrate 110 is an array substrate, and a common electrode arranged on the array substrate is an array common electrode. The array common electrode includes a first array common electrode 181 and a second array common electrode 182, and the array common electrode on the array substrate is configured to transmit a voltage signal and a control signal. The second substrate 120 is a color filter substrate, and the common electrode 140 arranged on the second substrate 120 may also be referred to as a color filter common electrode (Cf common electrode).

Figure 4:
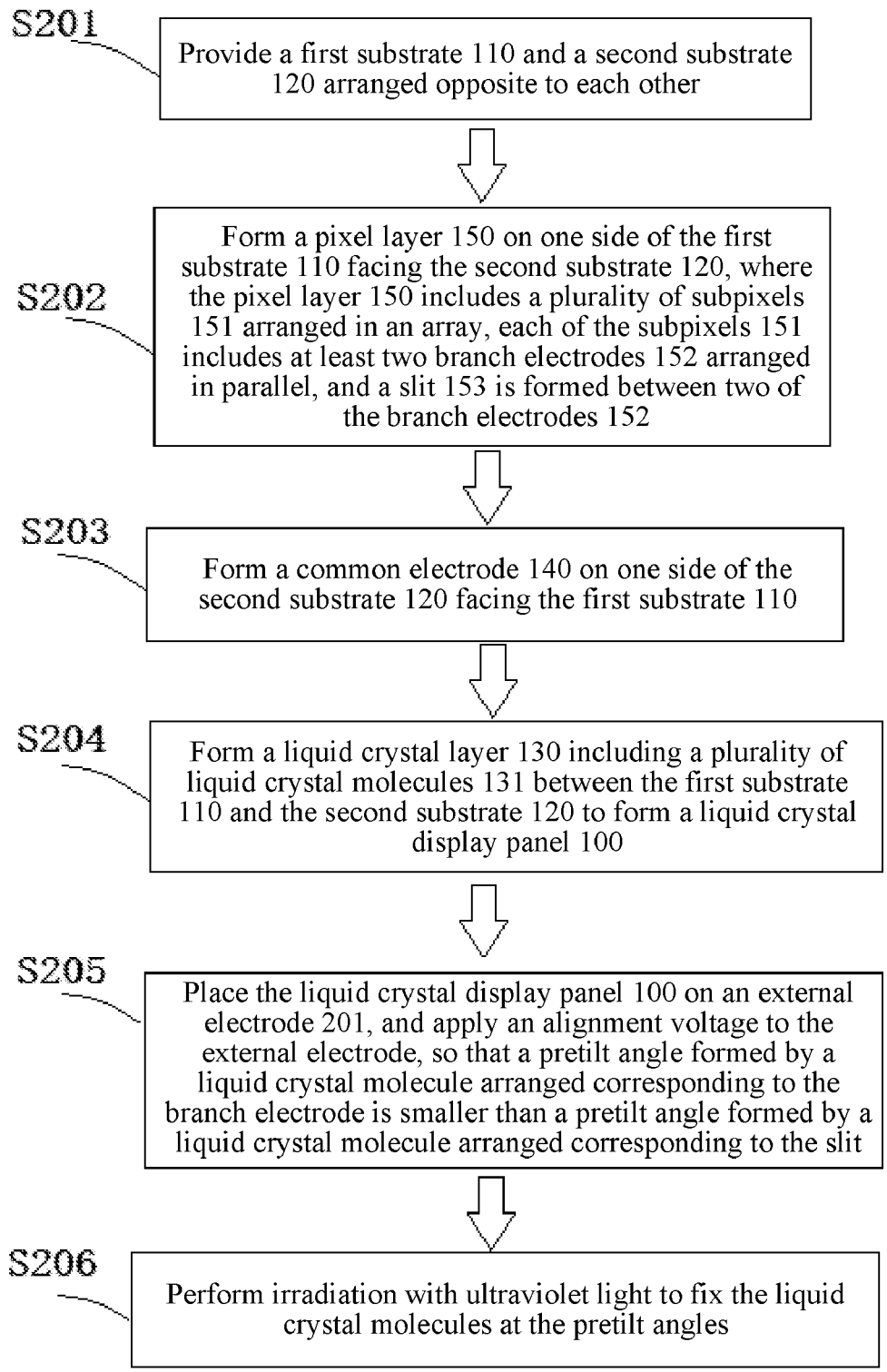
FIG. 4 is a flowchart of a liquid crystal alignment method according to an exemplary embodiment of the present invention.

In this embodiment, referring to FIG. 4, a liquid crystal alignment method includes:

S201. Provide a first substrate 110 and a second substrate 120 arranged opposite to each other.

S202. Form a pixel layer 150 on one side of the first substrate 110 facing the second substrate 120, where the pixel layer 150 includes a plurality of subpixels 151 arranged in an array, each of the subpixels 151 includes at least two branch electrodes 152 arranged in parallel, and a slit 153 is formed between two of the branch electrodes 152.

S203. Form a common electrode 140 on one side of the second substrate 120 facing the first substrate 110.

S204. Form a liquid crystal layer 130 including a plurality of liquid crystal molecules 131 between the first substrate 110 and the second substrate 120 to form a liquid crystal display panel 100.

S205. Place the liquid crystal display panel 100 on an external electrode 201, and apply an alignment voltage to the external electrode, so that a pretilt angle formed by a liquid crystal molecule arranged corresponding to the branch electrode is smaller than a pretilt angle formed by a liquid crystal molecule arranged corresponding to the slit.

S206. Perform irradiation with ultraviolet light to fix the liquid crystal molecules at the pretilt angles.

Specifically, a first alignment layer (not shown in the figure) may be arranged on one side of the pixel layer 150 facing the liquid crystal layer 130, and a second alignment layer (not shown in the figure) may be arranged on one side of the common electrode 140 facing the liquid crystal layer 130.

The ultraviolet light is irradiated by means of an ultraviolet main curing (UVM) machine. In step S207, the liquid crystal display panel 100 is transported to the UVM machine, and the UVM machine exposes the liquid crystal display panel 100 to ultraviolet rays. The first alignment layer and the second alignment layer interact with the liquid crystal molecules under the irradiation of the ultraviolet rays, thereby maintaining fixed pretilt angles of the liquid crystal molecules, and completing a liquid crystal alignment process of the liquid crystal display panel 100.

Figure 9:
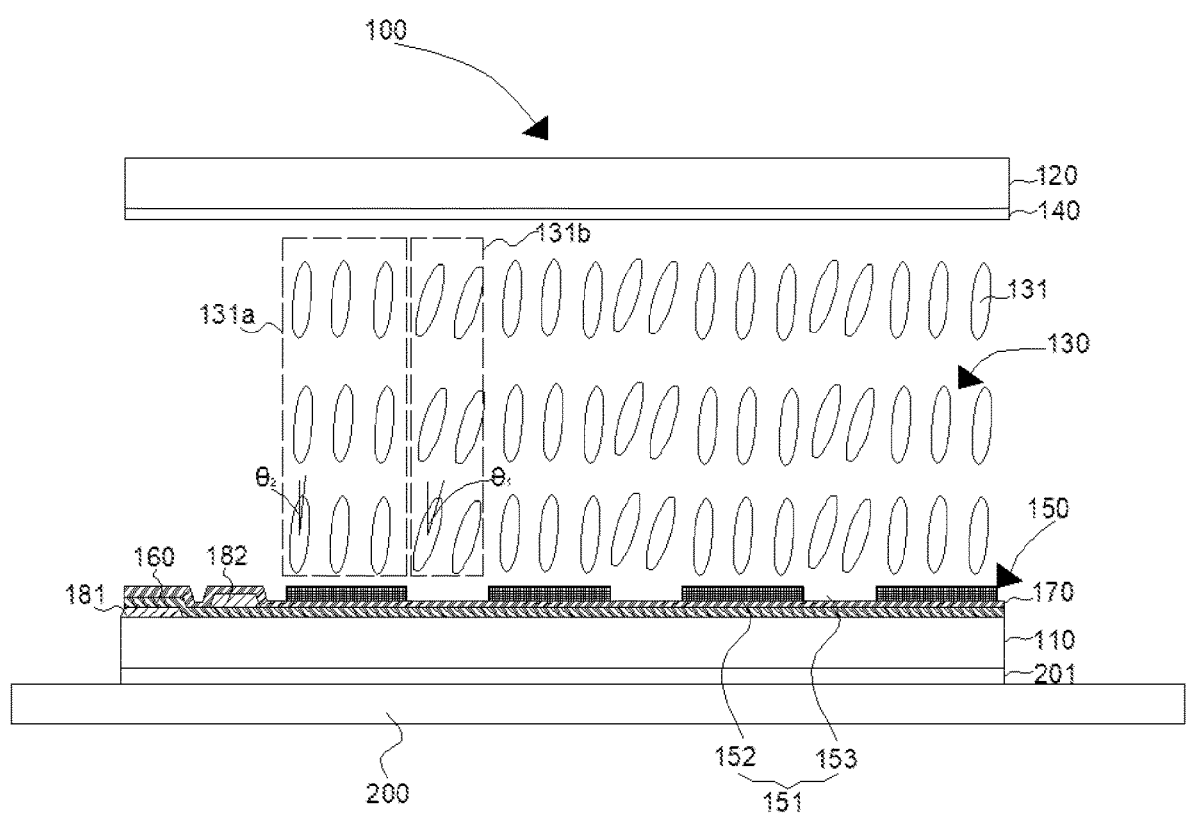
FIG. 9 is a schematic structural diagram of a liquid crystal display panel that cooperates with an alignment device in an alignment process according to an exemplary embodiment of the present invention.

This embodiment further provides an alignment device 200. The alignment device 200 includes an external electrode 201. Referring to FIG. 9, in an alignment process of the liquid crystal display panel 100, one side of the first substrate 110 is placed on the external electrode 201.

In this embodiment, one external electrode 201 corresponds to an entire pixel array in the pixel layer 150. As a preferred manner of the present invention, the external electrode 201 includes a plurality of electrode sublayers (not shown in the figure) arranged in sequence, and one electrode sublayer corresponds to some of the subpixels 151 in the pixel array.

In a liquid crystal alignment process, an alignment voltage is applied to the external electrode 201, and the alignment voltage is a high voltage (90-100 V). In this embodiment, an alignment voltage is set to 100 V, and a voltage, for example, 4 V, may be applied to the pixel layer 150 according to actual needs, to adjust an alignment electric field. No voltage is applied to the common electrode 140 (that is, the voltage on the common electrode 140 is 0 V), and the external electrode 201 receives the alignment voltage. Due to a voltage difference, an electric field is formed between the external electrode 201 and the common electrode 140, and a direction of the electric field is directed from the external electrode 201 to the common electrode 140 (Cf common electrode).

In the liquid crystal alignment process, when the external electrode 201 receives an alignment voltage and forms the electric field with the common electrode 140, due to a blocking or shielding effect of the branch electrode 152, an electric field strength between the branch electrode 152 and the common electrode 140 is weakened, and an electric field strength generated by a voltage difference of about 10 V is formed. Because there is no branch electrode 152 or other electrodes in the slit 153, there is no impedance, an electric field strength between the slit 153 and the common electrode 140 is enhanced, an electric field strength generated by a voltage difference of about 17 V is formed, and a difference between a voltage value between the slit 153 and the common electrode 140 and a voltage value between the branch electrode 152 and the common electrode 140 is 7 V. Therefore, when the external electrode 201 receives a high voltage, the electric field strength between the slit 153 and the common electrode 140 is significantly higher than the electric field strength between the branch electrode 152 and the common electrode 140. Therefore, a pretilt angle $\theta_2$ formed by a liquid crystal molecule 131 in a liquid crystal molecule region 131$a$ arranged corresponding to the branch electrode is significantly lower than a pretilt angle $\theta_1$ formed by a liquid crystal molecule 131 in a liquid crystal molecule region 131$b$ arranged corresponding to the slit. That is, a pretilt angle of a liquid crystal molecule corresponding to the line region and a pretilt angle of a liquid crystal molecule corresponding to the space region are differentiated. In this embodiment, the pretilt angle $\theta_2$ formed by the liquid crystal molecule 131 in the liquid crystal molecule region 131$a$ arranged corresponding to the branch electrode is 0.4°, the pretilt angle $\theta_1$ formed by the liquid crystal molecule 131 in the liquid crystal molecule region 131$b$ arranged corresponding to the silt is 2.4°, and a difference between $\theta_1$ and $\theta_2$ is 2.0°. Compared to that all pretilt angles $\theta_a$ of the liquid crystal molecules in the existing liquid crystal display panel are 1.4°, in this embodiment, an overall pretilt angle is increased and pretilt angles are differentiated. Further, in an actual driving process of the liquid crystal display panel 100, due to the overall increase and diversification of the pretilt angles, a response time and view angle features of medium and low grayscale of the liquid crystal display panel 100 can be improved.

Degrees such as 0.4°, 2.0°, and 1.4° of the pretilt angle are all exemplary degrees in this embodiment and are not fixed values. A specific degree of the pretilt angle may be determined according to actual needs.

The electric field strength may vary with a magnitude of the alignment voltage applied to the external electrode 201, to adjust magnitudes of $\theta_1$ and $\theta_2$, and adjust the difference between $\theta_1$ and $\theta_2$. That is, a differentiation range of the pretilt angles of liquid crystal molecules between the line region and the space region can be adjusted according to actual user requirements. A spacing between the common electrode 140 and the pixel layer 150 is set to a range of 3.2-3.3 μm, which can ensure the electric field strength.

In this embodiment, applying a high voltage to the external electrode 201 in the liquid crystal alignment process can increase a pretilt angle formed by the liquid crystal molecule 131 arranged corresponding to the branch electrode 152, and increase a pretilt angle formed by the liquid crystal molecule 131 arranged corresponding to the slit 153. After post-processing steps such as retreat and UV light irradiation, the pretilt angle formed by the liquid crystal molecule 131 in the liquid crystal molecule region 131$a$ arranged corresponding to the branch electrode is fixed at $\theta_2$ (0.4° in this embodiment), and the pretilt angle formed by the liquid crystal molecule 131 in the liquid crystal molecule region 131$b$ arranged corresponding to the slit is fixed at $\theta_1$ (2.4° in this embodiment).

In the actual driving process of the liquid crystal display panel 100, a voltage is applied to the common electrode 140, and the common electrode 140 receives a driving voltage (the same as the actual driving manner of the existing liquid crystal display panel). The external electrode 201 does not receive a voltage (that is, the voltage on the external electrode 201 is 0 V), and a voltage on the pixel layer 150 is about 8 V.

In addition, a relationship of a transmittance with an azimuth angle φ and a tilt angle θ is shown in the following equation:

$$T=\tfrac{1}{2}*\sin^2(2\varphi)*\sin^2(f(\theta))$$

Figure 5:
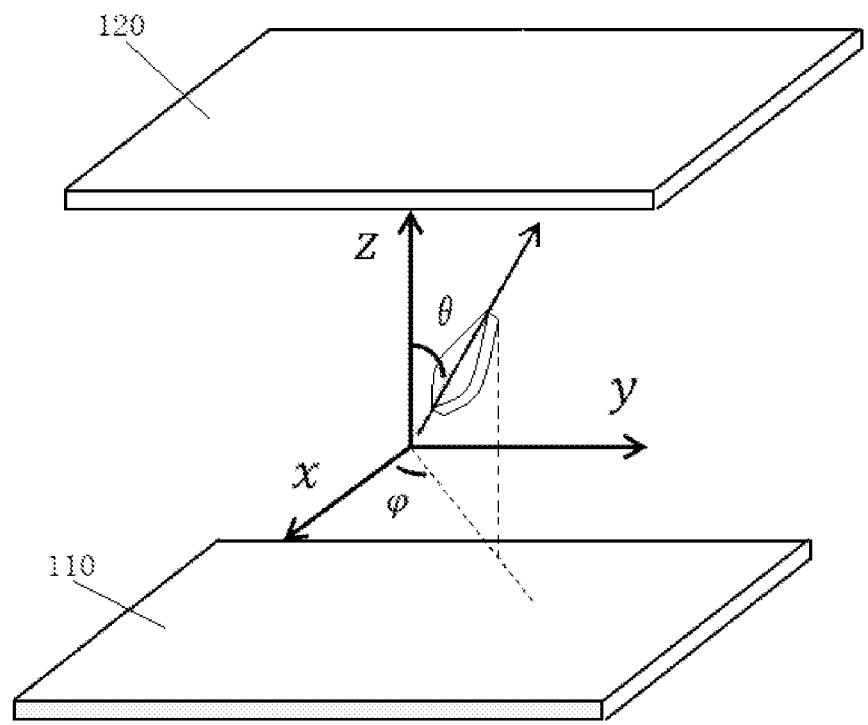
FIG. 5 is a schematic diagram of a first substrate, a second substrate, a pretilt angle of a liquid crystal molecule, and an azimuth angle of a liquid crystal molecule.
Figure 6:
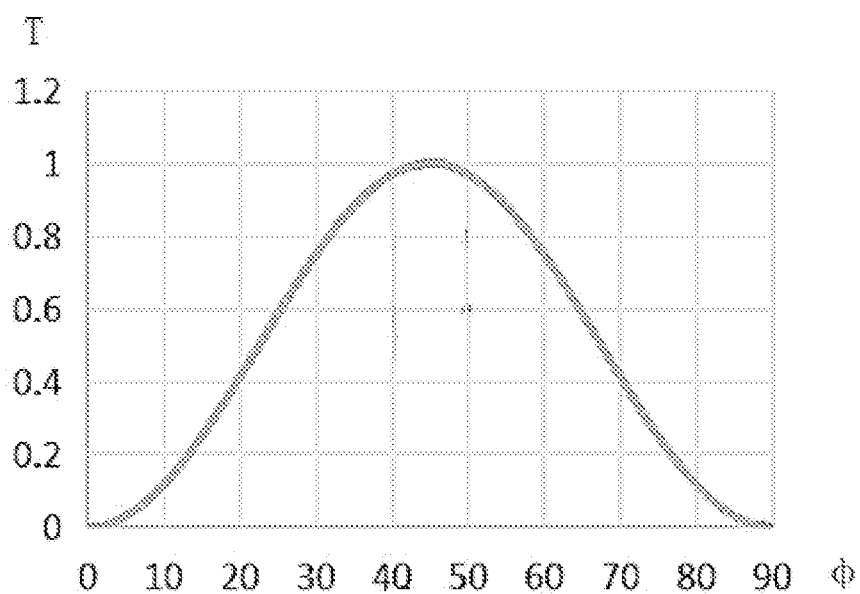
FIG. 6 is a schematic diagram of a relational curve between an azimuth angle and a transmittance.

With reference to the relational expression and referring to FIG. 5 and FIG. 6, when the pretilt angle θ is fixed, the transmittance T is the largest when the azimuth angle φ is 45° (in this case, a major axis of the liquid crystal molecule 131 is parallel to a lengthwise direction of the branch electrode 152), and a brightness of the liquid crystal display panel 100 is the highest; and when φ is 35° or 55°, T is reduced, and the brightness of the liquid crystal display panel 100 is relatively reduced. Referring to FIG. 5, the azimuth angle φ is an angle between an x-axis and an orthographic projection line of the liquid crystal molecule 131 on one side of the first substrate 110 facing the second substrate 120, and the pretilt angle θ is an angle between the liquid crystal molecules 131 and a z-axis (that is, a vertical direction).

Figure 1A:
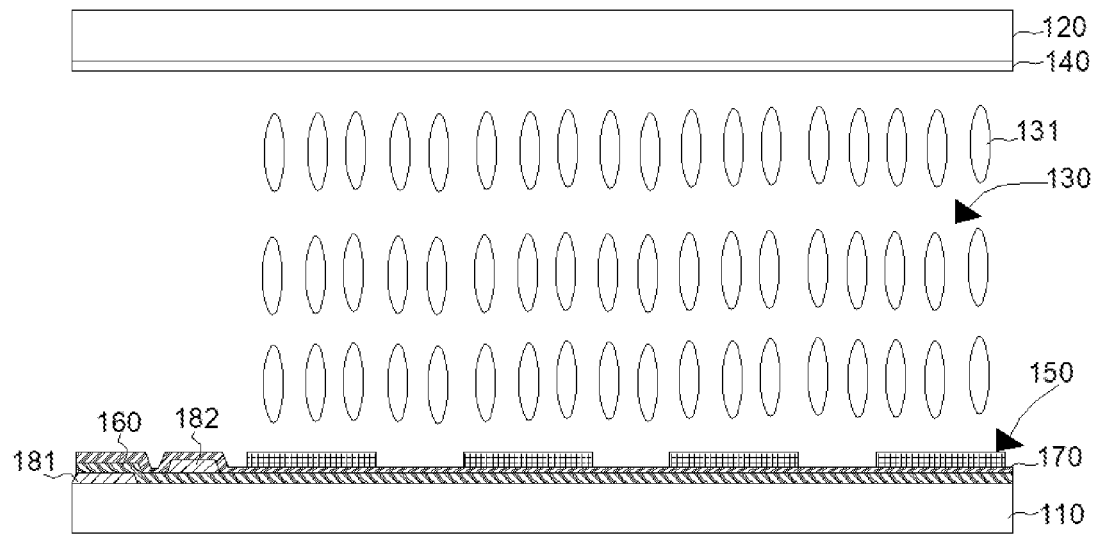
FIG. 1(a) is a cross-sectional view of a liquid crystal display panel before liquid crystal alignment.
Figure 1B:
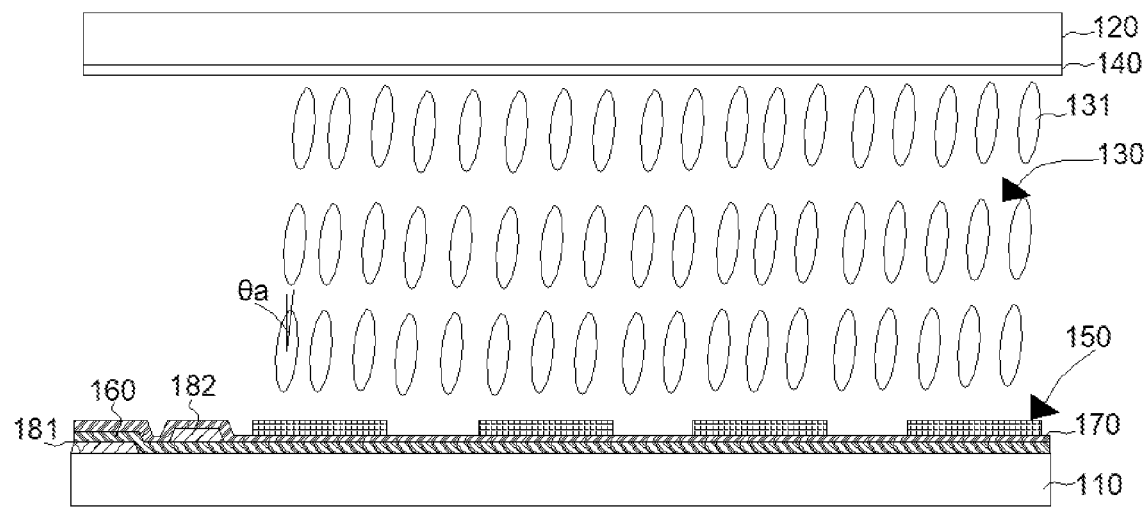
FIG. 1(b) is a cross-sectional view of a liquid crystal display panel after liquid crystal alignment is completed.
Figure 1C:
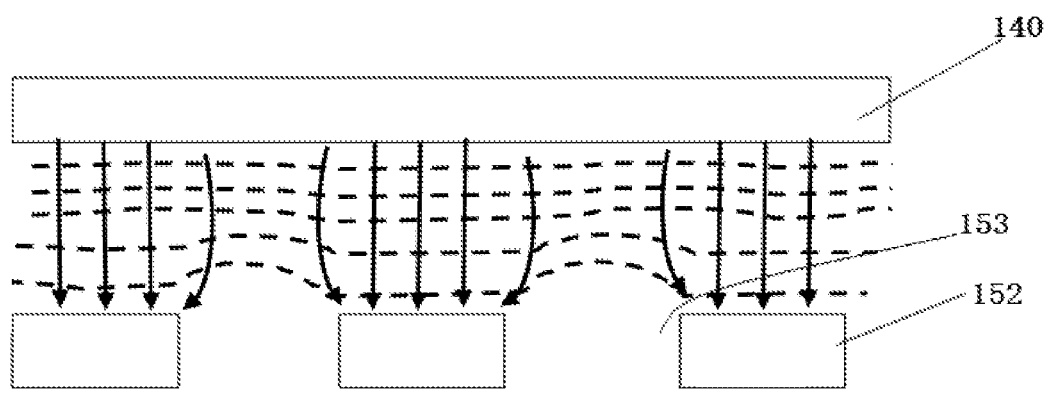
FIG. 1(c) is a schematic diagram of an electric field strength between a branch electrode and a common electrode and an electric field strength between a slit and the common electrode in a same domain region of a subpixel of a pixel layer in a liquid crystal alignment process of the existing liquid crystal display panel.

For the existing liquid crystal display panel, referring to FIG. 1($a$) and FIG. 1($b$), in the liquid crystal alignment process, the common electrode 140 receives an alignment voltage, and a direction of the electric field is directed from the common electrode 140 to the pixel layer 150. After the liquid crystal alignment is completed, pretilt angles $\theta_a$ of liquid crystal molecules 131 in the liquid crystal layer 130 are the same, and are all 1.4°, that is, the pretilt angle $\theta_a$ is fixed. In the actual driving process of the liquid crystal display panel, a driving voltage is also applied to the common electrode 140, and a direction of a driving electric field is also directed from the common electrode 140 to the pixel layer 150 (the same direction as the electric field). Therefore, azimuth angles of liquid crystal molecules at edge regions of the driving electric field corresponding to the existing liquid crystal display panel do not change. Generally, because electric field strengths of the edge regions are lower than an electric field strength of a central region of the driving electric field, azimuth angles φ of the liquid crystal molecules corresponding to the edge regions are not 45°, and may deflect. That is, the azimuth angles φ of the liquid crystal molecules at the edge regions of the driving electric field may be 35° or 55°, which reduces the transmittance T and the brightness of the edge regions of the existing liquid crystal display panel.

In this embodiment of the present invention, in the liquid crystal alignment process, the external electrode 201 receives an alignment voltage, and a direction of the electric field is directed from the external electrode 201 to the common electrode 140. After the liquid crystal alignment is completed, the pretilt angle θ is fixed (for example, in this embodiment, $\theta_1$ is 2.4° and $\theta_2$ is 0.4°). In the actual driving process of the liquid crystal display panel 100, a driving voltage is applied to the common electrode 140, and a direction of a driving electric field is also directed from the common electrode 140 to the pixel layer 150 (opposite to the direction of the electric field). In this case, in the liquid crystal alignment process, due to the effect of the electric field, electric field strengths of the edge regions are lower than an electric field strength of a central region of the electric field. Therefore, the azimuth angles φ of the liquid crystal molecules corresponding to the edge regions of the electric field are not 45°, but may be 35° or 55°.

Figure 7:
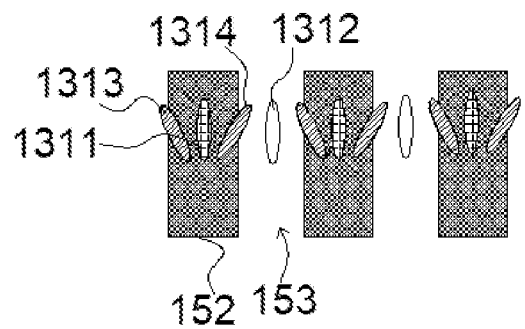
FIG. 7 is a schematic diagram of azimuth angles of liquid crystal molecules on a liquid crystal display panel after liquid crystal alignment is completed according to an exemplary embodiment of the present invention.

Referring to FIG. 7, in this embodiment, the liquid crystal molecules 131 at edge positions on opposite sides of the branch electrode 152 are a liquid crystal molecule 1313 (an azimuth angle is 55°) and a liquid crystal molecule 1314 (an azimuth angle is 35°), the liquid crystal molecule 131 at a central position of the branch electrode 152 is a liquid crystal molecule 1311 (an azimuth angle is 45°), and the liquid crystal molecule 131 corresponding to the slit 153 is a liquid crystal molecule 1312. A difference between the azimuth angle of the liquid crystal molecule 1313 and the azimuth angle of the liquid crystal molecule 1311 is 55°−45°=10°, and a difference between the azimuth angle of the liquid crystal molecule 1314 and the azimuth angle of the liquid crystal molecule 1311 is 35°−45°=−10°. Absolute values of 10° and −10° are both 10°, that is, the absolute values are equal.

In an actual driving process of the liquid crystal display panel 100, a driving electric field is opposite to a direction of the electric field. Due to the effect of the driving electric field, a force opposite to that in a previous liquid crystal alignment process is applied to liquid crystal molecules at the edge regions of the driving electric field, thereby correcting the azimuth angles φ of the liquid crystal molecules at the edge regions of the driving electric field. Therefore, the azimuth angles φ of the liquid crystal molecules at the edge regions of the driving electric field are close to 45°, that is, the liquid crystal molecules 131 and the direction of the major axis of the liquid crystal molecules at the edge regions of the driving electric field is parallel to or approximately parallel to the branch electrode 152 (or a lengthwise direction of the line region). Therefore, in the actual driving process, azimuth angles φ of all the liquid crystal molecules 131 in the liquid crystal layer 130 are approximately equal to 45°.

Figure 8:
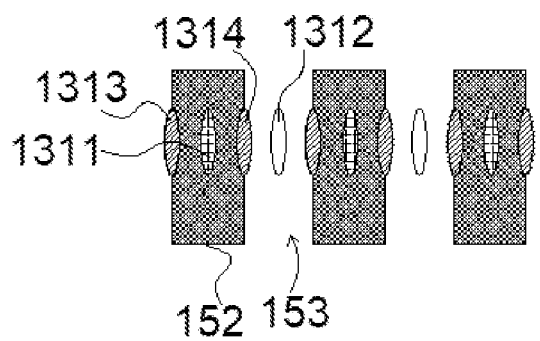
FIG. 8 is a schematic diagram of azimuth angles of liquid crystal molecules during actual driving of a liquid crystal display panel according to an exemplary embodiment of the present invention.

In this embodiment, referring to FIG. 8, in an actual driving process, the azimuth angles φ of the liquid crystal molecule 1313 and the liquid crystal molecule 1314 are both 45°, that is, a difference between the azimuth angle φ of the liquid crystal molecule 1313 and the azimuth angle φ of the liquid crystal molecule 1311 is 0, and a difference between the azimuth angle φ of the liquid crystal molecule 1314 and the azimuth angle φ of the liquid crystal molecule 1311 is 0; or an absolute value of a difference between the azimuth angle φ of the liquid crystal molecule 1313 and the azimuth angle φ of the liquid crystal molecule 1311 is less than or equal to 1, and an absolute value of a difference between the azimuth angle φ of the liquid crystal molecule 1314 and the azimuth angle φ of the liquid crystal molecule 1311 is less than or equal to 1. For example, the azimuth angle of the liquid crystal molecule 1313 is 46°, and the azimuth angle of the liquid crystal molecule 1314 is 44°, both being close to 45°. In this way, a difference between a liquid crystal penetration contribution of a slit region and the space region is small, so that the transmittance T of the liquid crystal display panel 100 is at or close to the maximum. Compared to the existing liquid crystal display panel, the overall transmittance T can be improved, so that the brightness of the liquid crystal display panel 100 is higher and more uniform.

In conclusion, the present disclosure has been disclosed above through preferred embodiments. However, the preferred embodiments are not intended to limit the present disclosure, and a person of ordinary skill in the art can make various modifications and improvements without departing from the spirit and scope of the present disclosure. Therefore, the protection scope of the present disclosure should be subject to the scope defined by the claims.

What is claimed is:

1. A liquid crystal alignment method, comprising:
providing a first substrate and a second substrate arranged opposite to each other;
forming a pixel layer on a side of the first substrate facing the second substrate, wherein the pixel layer comprises a plurality of subpixels arranged in an array, each of the subpixels comprises at least two branch electrodes arranged in parallel, and a slit is formed between two of the branch electrodes;
forming a common electrode on a side of the second substrate facing the first substrate;
forming a liquid crystal layer comprising a plurality of liquid crystal molecules between the first substrate and the second substrate to form a liquid crystal display panel;
placing the liquid crystal display panel on an external electrode, and applying an alignment voltage to the external electrode, so that a first pretilt angle of each of first ones of the liquid crystal molecules opposite to one of the branch electrodes is less than a second pretilt angle of each of second ones of the liquid crystal molecules opposite to the slit; and
performing irradiation with ultraviolet light to fix each of the liquid crystal molecules at the first pretilt angle or the second pretilt angle.

2. The liquid crystal alignment method according to claim 1, wherein an electric field strength between each of the branch electrodes and the common electrode is less than an electric field strength between the slit and the common electrode.

3. The liquid crystal alignment method according to claim 1, wherein a voltage value of the alignment voltage ranges from 90 V to 100 V.

4. The liquid crystal alignment method according to claim 1, wherein during actual driving after alignment is completed, a driving voltage is applied to the common electrode, and an azimuth angle of each of two of the liquid crystal molecules respectively at opposite side edges of each of the branch electrodes is equal to an azimuth angle of one of the liquid crystal molecules at a central position of the each of the branch electrodes.

5. The liquid crystal alignment method according to claim 1, wherein during actual driving after alignment is completed, a driving voltage is applied to the common electrode, and an absolute value of a difference between an azimuth angle of each of two of the liquid crystal molecules respectively at opposite side edges of each of the branch electrodes and an azimuth angle of one of the liquid crystal molecules at a central position of the each of the branch electrodes is less than or equal to 1.

6. The liquid crystal alignment method according to claim 1, wherein:
the liquid crystal display panel is placed on the external electrode so that the first substrate is located between the external electrode and the pixel layer.

7. A liquid crystal display panel, comprising:
a first substrate and a second substrate arranged opposite to each other;
a liquid crystal layer comprising a plurality of liquid crystal molecules and arranged between the first substrate and the second substrate;

a common electrode arranged on a side of the second substrate facing the first substrate; and a pixel layer arranged on a side of the first substrate facing the second substrate, wherein the pixel layer comprises a plurality of subpixels arranged in an array, each of the subpixels comprises at least two branch electrodes arranged in parallel, and a slit is formed between two of the branch electrodes, wherein a first pretilt angle of each of first ones of the liquid crystal molecules opposite to one of the branch electrodes is less than a second pretilt angle of each of second ones of the liquid crystal molecules opposite to the slit.

8. The liquid crystal display panel according to claim 7, wherein a gate insulating layer and a protective layer are arranged between the first substrate and the pixel layer in a stacking manner, and the pixel layer is arranged on the protective layer.

9. The liquid crystal display panel according to claim 8, wherein a first array common electrode is arranged between the gate insulating layer and the first substrate.

10. The liquid crystal display panel according to claim 8, wherein a second array common electrode is arranged between the protective layer and the gate insulating layer.

11. The liquid crystal display panel according to claim 7, wherein a spacing between the common electrode and the pixel layer ranges from 3.2 µm to 3.3 µm.

12. The liquid crystal display panel according to claim 7, wherein a difference between an azimuth angle of each of two of the liquid crystal molecules respectively at opposite side edges of each of the branch electrodes and an azimuth angle of one of the liquid crystal molecules at a central position of the each of the branch electrodes has a same absolute value.

13. The liquid crystal display panel according to claim 7, further comprising a first alignment layer arranged on a side of the pixel layer facing the liquid crystal layer and a second alignment layer arranged on a side of the common electrode facing the liquid crystal layer.

14. A mobile terminal, comprising a terminal body and a liquid crystal display panel, wherein the liquid crystal display panel comprises:

a first substrate and a second substrate arranged opposite to each other;

a liquid crystal layer comprising a plurality of liquid crystal molecules and arranged between the first substrate and the second substrate;

a common electrode arranged on a side of the second substrate facing the first substrate; and a pixel layer arranged on a side of the first substrate facing the second substrate, wherein the pixel layer comprises a plurality of subpixels arranged in an array, each of the subpixels comprises at least two branch electrodes arranged in parallel, and a slit is formed between two of the branch electrodes, wherein a first pretilt angle of each of first ones of the liquid crystal molecules opposite to one of the branch electrodes is less than a second pretilt angle of each of second ones of the liquid crystal molecules opposite to the slit.

15. The mobile terminal according to claim 14, wherein a gate insulating layer and a protective layer are arranged between the first substrate and the pixel layer in a stacking manner, and the pixel layer is arranged on the protective layer.

16. The mobile terminal according to claim 15, wherein a first array common electrode is arranged between the gate insulating layer and the first substrate.

17. The mobile terminal according to claim 15, wherein a second array common electrode is arranged between the protective layer and the gate insulating layer.

18. The mobile terminal according to claim 14, wherein a spacing between the common electrode and the pixel layer ranges from 3.2 µm to 3.3 µm.

19. The mobile terminal according to claim 14, wherein a difference between an azimuth angle of each of two of the liquid crystal molecules respectively at opposite side edges of each of the branch electrodes and an azimuth angle of one of the liquid crystal molecules at a central position of the each of the branch electrodes has a same absolute value.

20. The mobile terminal according to claim 14, wherein the liquid crystal display panel further comprises a first alignment layer arranged on a side of the pixel layer facing the liquid crystal layer and a second alignment layer arranged on a side of the common electrode facing the liquid crystal layer.

* * * * *